Patented May 2, 1950

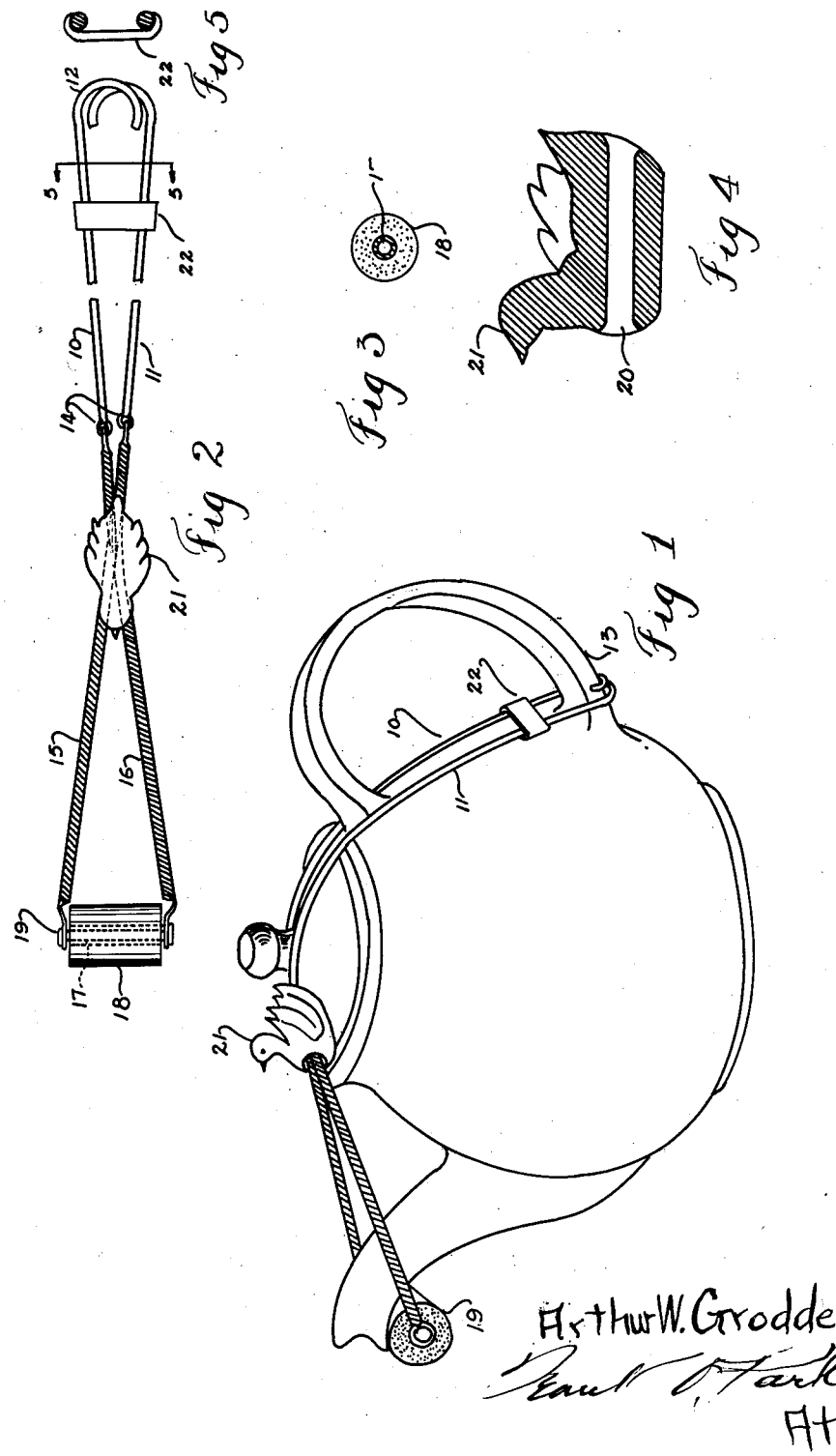

2,506,211

UNITED STATES PATENT OFFICE 2,506,211

POT COVER HOLDER AND DRIP CATCHER

Arthur W. Grodde, Ottawa, Ontario, Canada

Application December 7, 1945, Serial No. 633,496

2 Claims. (Cl. 222—108)

This invention relates to new and useful improvements in tea and coffee pot lid holders. Its primary object is to provide a simple attachment for the use of holding in place, pot lids while pouring tea, coffee or other liquids.

A further object is that the said invention is provided with a drip catcher and will prevent the contents of the pot dripping on the hands or table cloth etc., while serving tea or coffee.

With these and other objects in view that may appear while the description proceeds the invention comprises the novel construction and arrangement of coordinating parts as hereinafter more specifically set forth, claimed and shown in the accompanying drawings forming part of this application and in which:

Fig. 1 is a view of a tea pot with my invention shown in its proper location;

Fig. 2 is a plan view of tea and coffee pot lid holder;

Fig. 3 is an end view of drip catcher;

Fig. 4 is a section through decorative design serving also to adjust lid holder;

Fig. 5 is a section taken along line 5—5 of Fig. 2.

Referring more in detail to the drawings in which similar reference characters designate corresponding parts throughout it will be seen the invention comprises two steel wires 10, and 11, the lower ends of which are terminated in loops 12, formed to engage around the lower end 13, of a tea or coffee pot handle and its opposite ends 14, interlooped into two pieces 15 and 16, of a flexible material, such as a coil spring. The other extremities of flexible members 15 and 16, are permanently fastened to the center piece 17, of drip catcher 18, and are secured by rivet 19. The flexible members 15, and 16, are entered and pass through a bore extending longitudinally of the body of the runner 20, of a decorative design 21, which may consist of a duck as shown or any other design.

The arrangement of Fig. 1, clearly shows how my invention should be installed for best results, i. e. wires 10, and 11, straddle the button of the tea or coffee pot lid and the loops 12 are engaged around the lower end 13 of the pot handle. After the wires 10 and 11, are positioned in engagement with the lower end of the pot handle the clip 22, is positioned as shown and will firmly hold wires 10 and 11, securely.

The drip catcher 18, is constructed of a solid center piece 17, which may be any hard material and is covered by a thick coat of absorbent material such as sponge and will act as such for any last drop which may fall off after pouring a cup of tea or coffee.

It is believed that the construction and advantages of the structure shown will be apparent from the foregoing paragraphs taken in conjunction with the accompanying drawings without further detailed description.

While the preferred embodiment of the invention has been disclosed it is understood that minor changes in the details of construction, combination and arrangement of cooperating parts may be resorted to within the scope of what is claimed without departing from the spirit of the invention.

I claim:

1. A pot cover holder comprising a pair of coil springs disposed transversely of the pot cover in straddling relation to the handle of the cover, means connecting one end of said coil springs together adapted to engage around the spout of the pot, a pair of parallel wires hingedly connected at one end to the free ends of said coil springs, inwardly directed hooks at the free ends of said wires adapted to engage around the lower end of the pot handle, a clip bridging said wires and slidable thereon to hold the hooks in engagement with the pot handle, and a runner slidably mounted on said coil springs for adjustment to contract the springs and wires into close engagement with the pot cover handle.

2. A pot cover holder of the character described in claim 1 wherein the means connecting one end of said coil springs together is a roll of absorbent material.

ARTHUR W. GRODDE.

REFERENCES CITED

The following references are of record in the file of this patent:

UNITED STATES PATENTS

| Number | Name | Date |
|---|---|---|
| 1,336,491 | Stern | Apr. 13, 1920 |
| 1,438,706 | Hegenberg | Dec. 12, 1922 |
| 1,513,581 | Caumont | Oct. 28, 1924 |

FOREIGN PATENTS

| Number | Country | Date |
|---|---|---|
| 548,500 | France | Jan. 16, 1923 |